INVENTORS
THOMAS N. HICKEY
CHARLES B. HOOD, Jr.
BY

ATTORNEYS

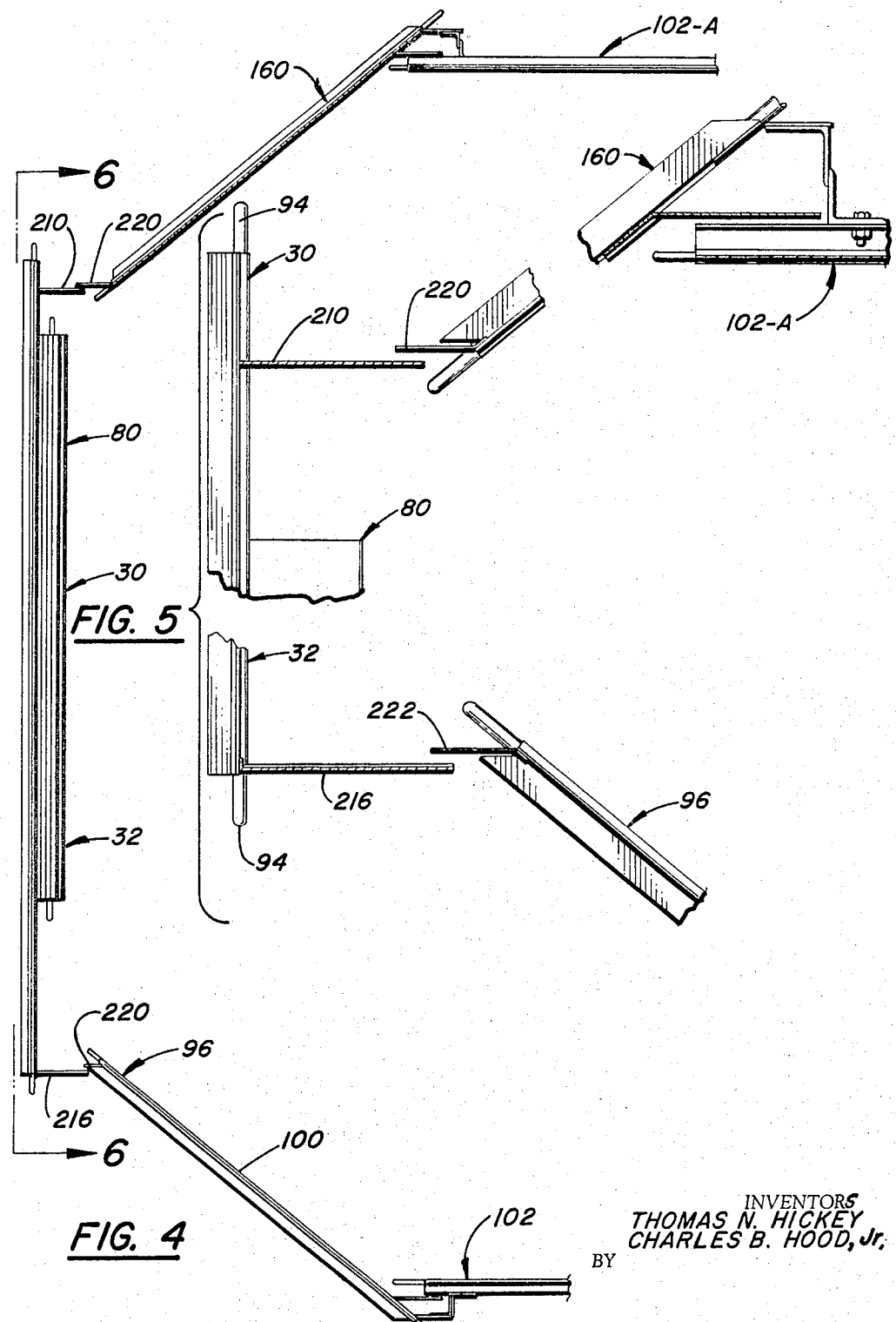

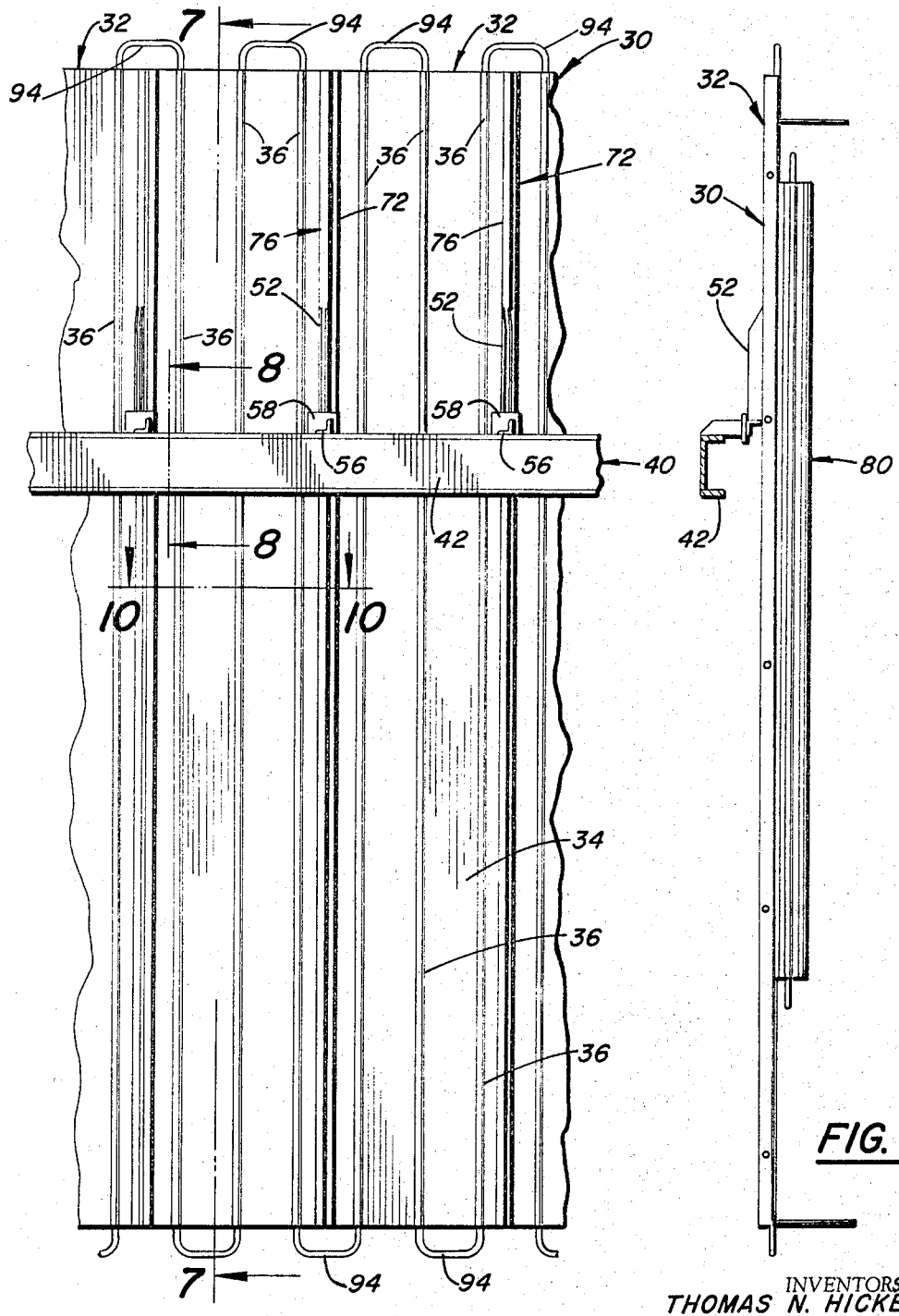

Sept. 20, 1966     T. N. HICKEY ETAL     3,273,636
SPACE SIMULATION CHAMBER
Filed Oct. 31, 1962     16 Sheets-Sheet 6
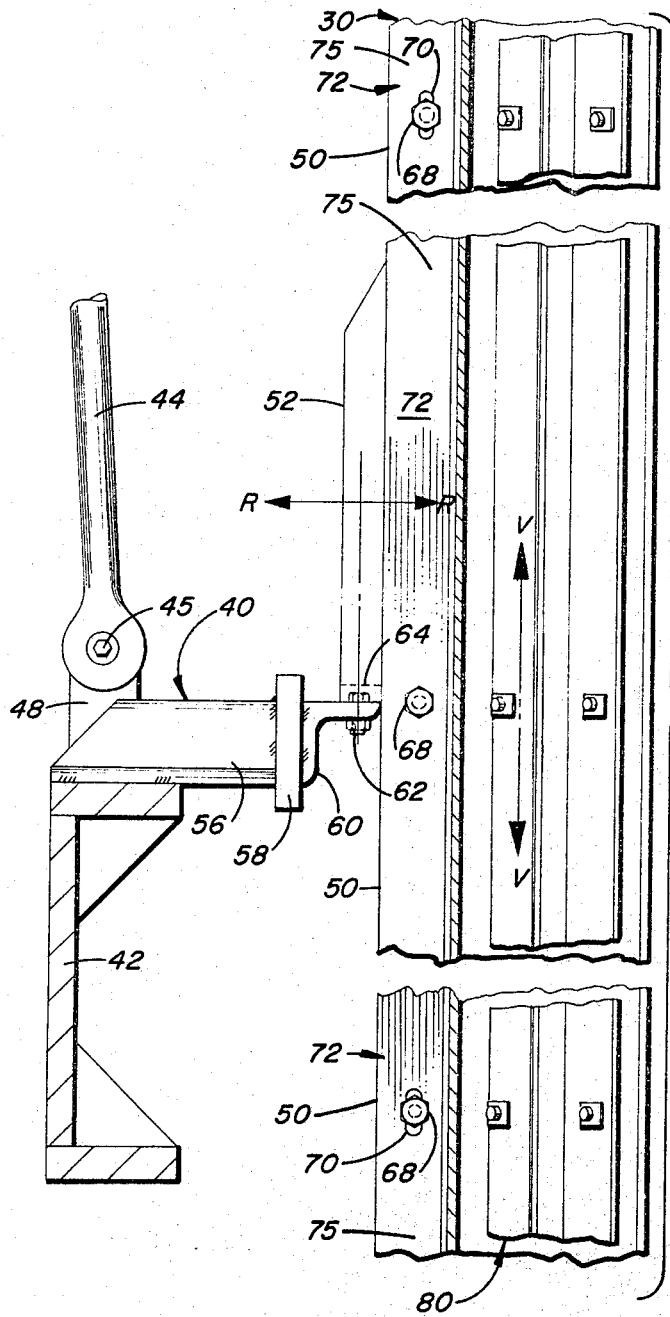
FIG. 8
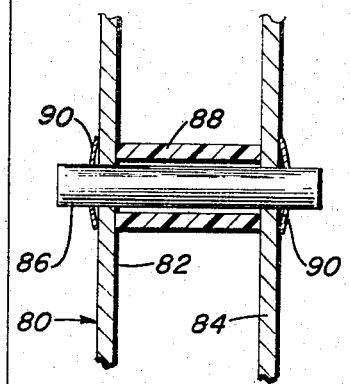
FIG. 9
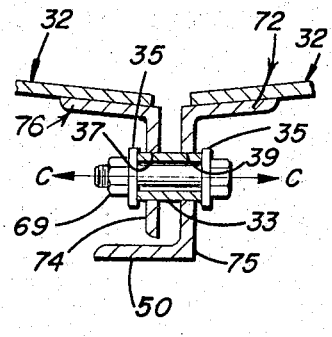
FIG. 10·A
INVENTORS
THOMAS N. HICKEY
CHARLES B. HOOD, Jr.
BY
ATTORNEYS

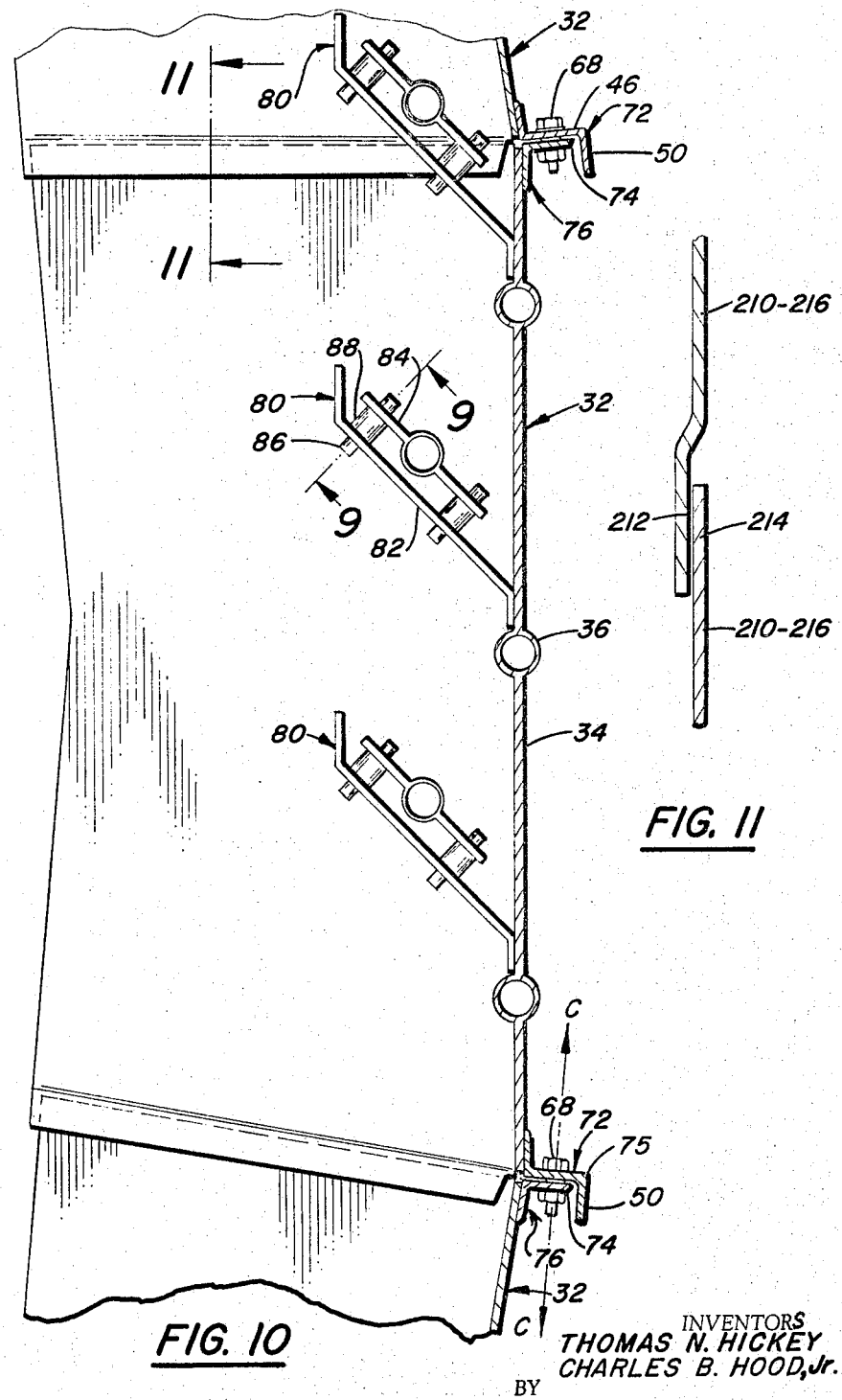

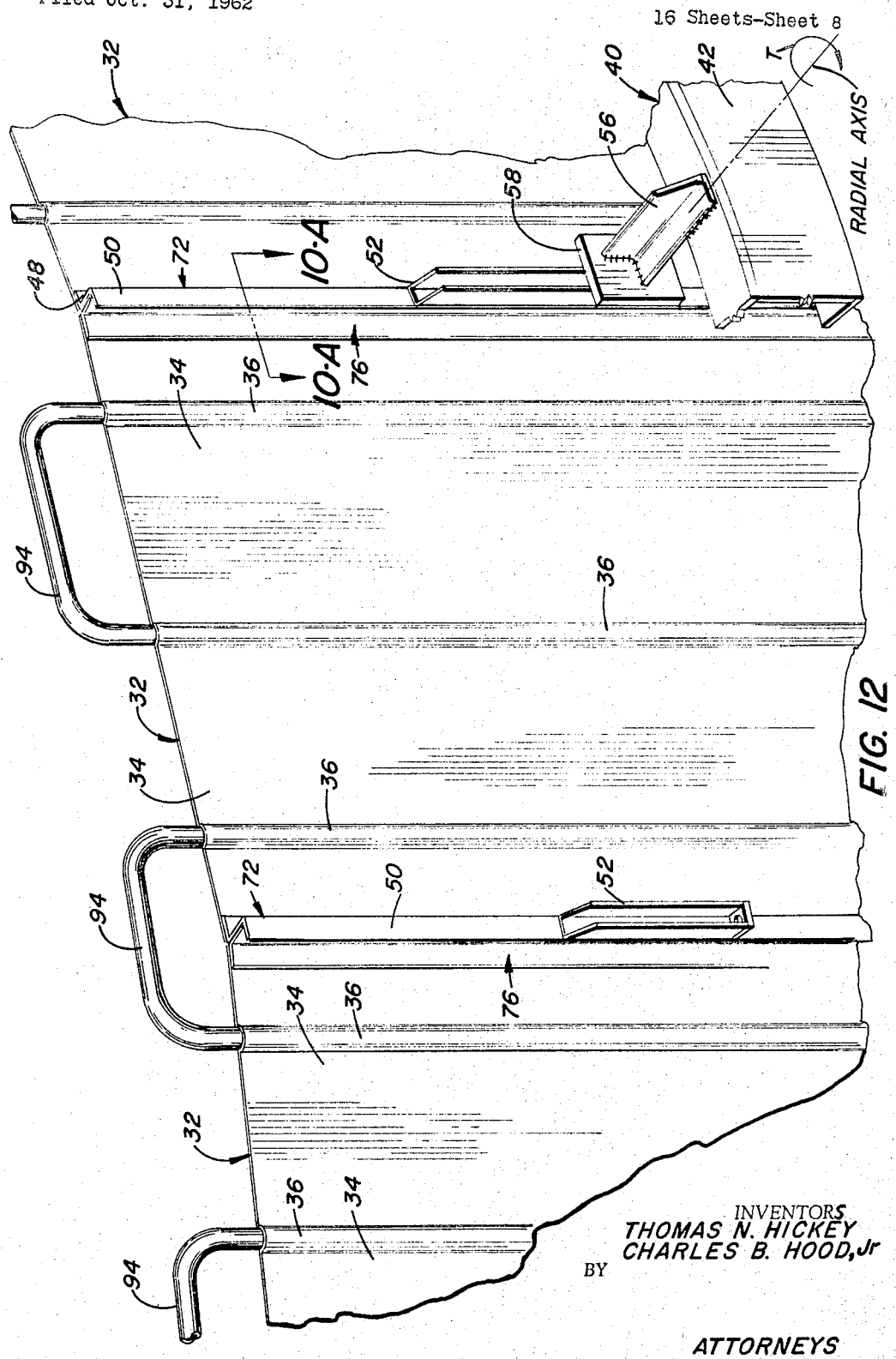

Sept. 20, 1966  T. N. HICKEY ETAL  3,273,636
SPACE SIMULATION CHAMBER
Filed Oct. 31, 1962  16 Sheets-Sheet 9

INVENTORS
THOMAS N. HICKEY
CHARLES B. HOOD, Jr.
BY

ATTORNEYS

INVENTORS
THOMAS N. HICKEY
CHARLES B. HOOD, Jr.
BY

ATTORNEYS

Sept. 20, 1966  T. N. HICKEY ETAL  3,273,636
SPACE SIMULATION CHAMBER
Filed Oct. 31, 1962  16 Sheets-Sheet 11

INVENTORS
THOMAS N. HICKEY
CHARLES B. HOOD, Jr.
BY

ATTORNEYS

INVENTORS
THOMAS N. HICKEY
CHARLES B. HOOD, Jr.
BY

ATTORNEYS

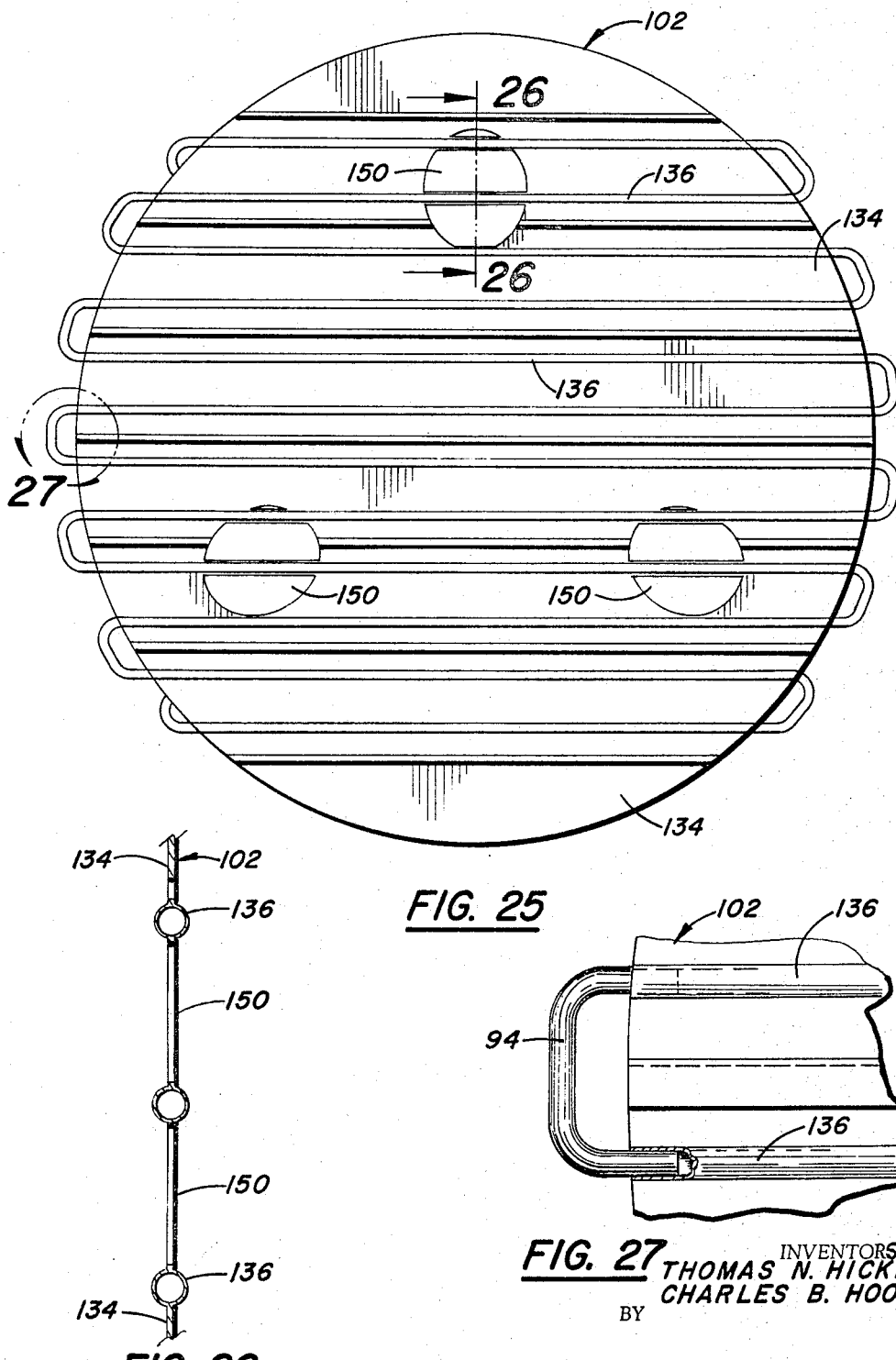

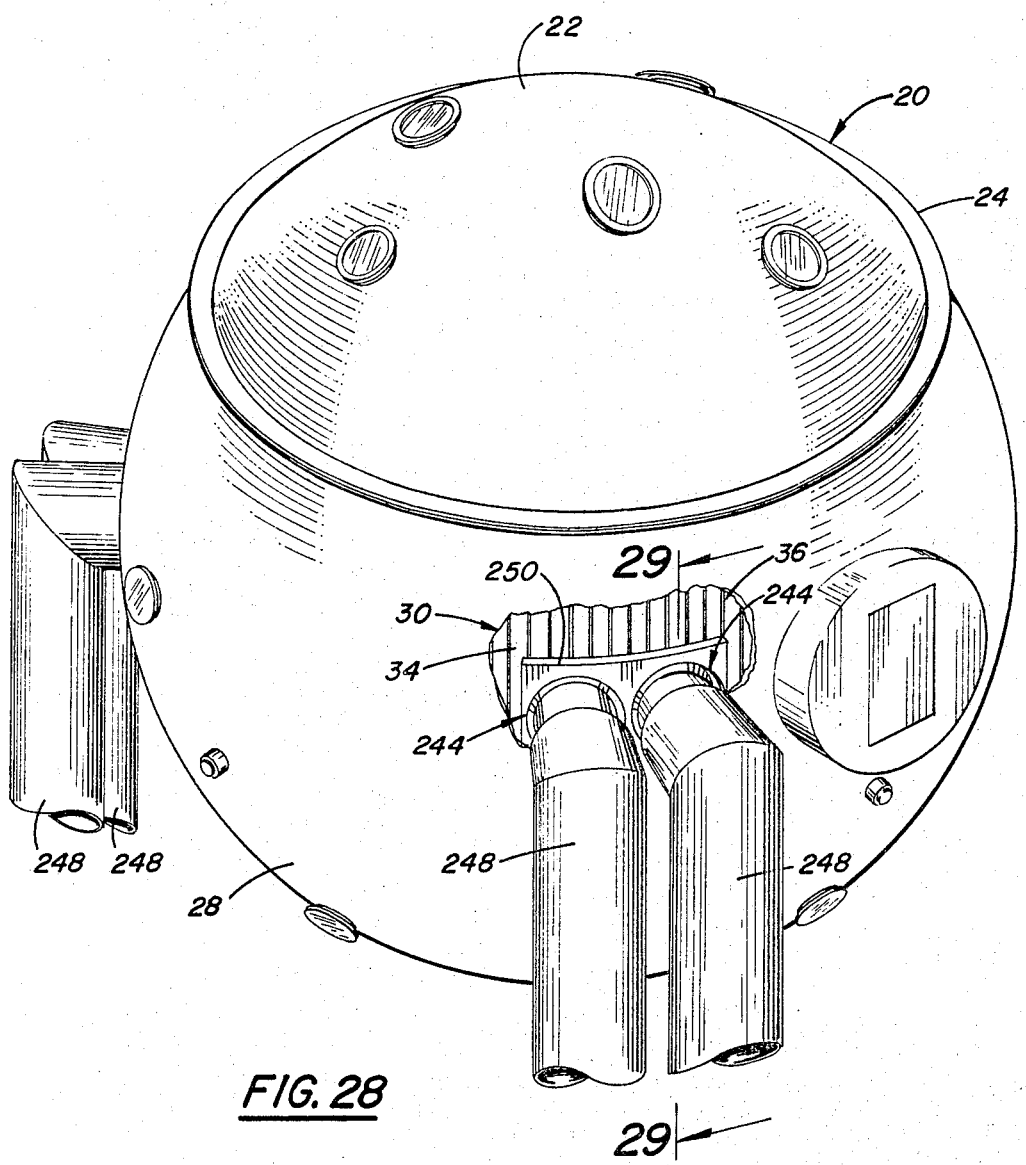

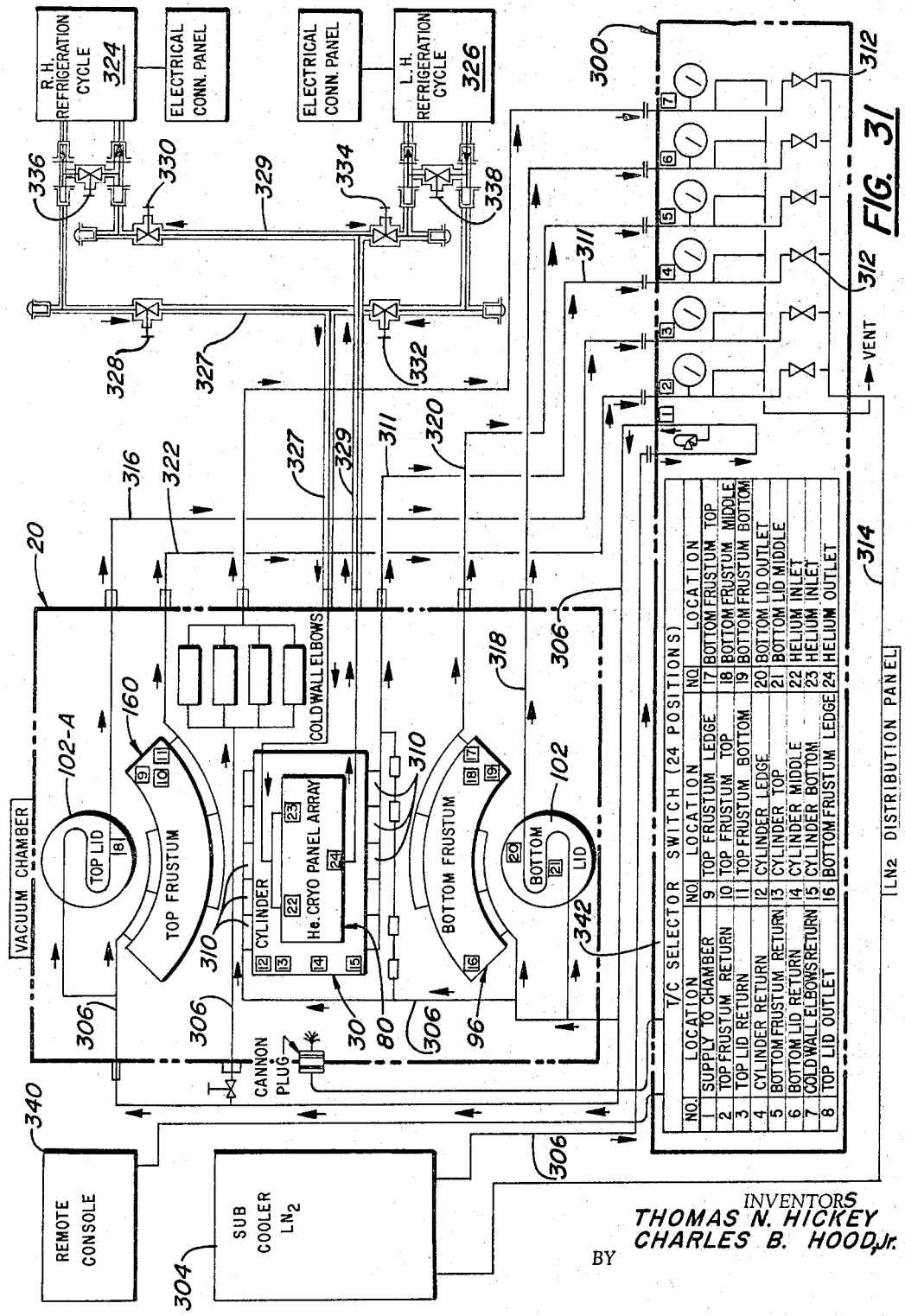

United States Patent Office 3,273,636
Patented Sept. 20, 1966

3,273,636
SPACE SIMULATION CHAMBER
Thomas N. Hickey and Charles B. Hood, Jr., Columbus, Ohio, assignors to Cryovac, Inc., Columbus, Ohio, a corporation of Ohio
Filed Oct. 31, 1962, Ser. No. 216,625
25 Claims. (Cl. 165—67)

This invention relates to space simulation chambers and to cryogenic thermal shrouds for such apparatus.

Chambers of this general nature include an outer housing or structural wall adapted to withstand pressures when evacuated and a thermal shroud suspended within the housing, the latter being refrigerated and provided with a flat black inner surface to simulate the infinite heat sink conditions of outer space.

The thermal shroud is formed from a plurality of cryopumping panels which effect the condensation of gases on surfaces within the chamber, the cryopumping being performed by refrigerating the shroud with flows of a cryogenic fluid.

In accordance with the present invention, the thermal shroud is fabricated from three assemblies of refrigerated panel members namely an assembly of side wall panels, an assembly of bottom wall panels, and an assembly of top wall panels. Each of the subassemblies of panels is separately mounted within the outer housing in a novel manner whereby the subassemblies are thermally expandable and contractable relative to the outer housing and, moreover, the horizontally extending junctions between the panel assemblies are constructed so as to be optically tight notwithstanding expansion and contraction of the panel assemblies.

As another aspect of the present invention, the individual panels that make up the above mentioned panel assemblies are joined to one another in a novel manner whereby each panel is individually expandable and contractable, relative to adjacent panels, under thermally imposed expansion and contraction.

As another aspect to the present invention, the space simulation chamber comprises an outer structural wall of spherical configuration and a thermal shroud formed of a refrigerated side wall panel assembly and top and bottom wall panel assemblies of frusto-conical configuration whereby the panel assemblies, when joined together, approximate the characteristics of a spherical shroud configuration in a structurally practical manner that is adapted for efficient refrigeration.

It is another aspect of the present invention to provide a space simulation chamber of the type described that includes a novel suspension system for supporting a refrigerated thermal shroud within an outer structural wall that surrounds it.

As another aspect of the present invention, the novel space simulation chamber includes an outer cover and shroud top wall panel assembly that are together removeable to provide ready access to the interior of the chamber.

As another aspect of the present invention, the space simulation chamber includes a novel diffusion pump penetration wherein the exhaust conduit from the chamber to the diffusion pump includes an inlet end that penetrates not only the outer structural wall of the chamber but also the thermal shroud whereby gas is exhausted directly from the inner test chamber within the shroud rather than from the outer zone between the shroud and the inner surface of the structural wall. This prevents the pumping of warm surface entrapped gas that lies along the inner surface of the outer structural wall, adjacent to ambient temperatures, and permits reducing the pressure in the test chamber within the shroud to a pressure below the free molecular flow region for the gas molecules which is $1 \times 10^{-5}$ millimeters of mercury and, moreover, the pressure in the outer zone between the shroud and the structural wall, is also reduced to said free molecular flow region. As a result, the only movement of the gas molecules is random and there is no flow gradient across the shroud or from the surface entrapped gas at the structural wall to the interior of the shroud.

As another aspect of the present invention, the previously mentioned panels that make up the shroud panel assemblies are supported, in a novel manner, to permit thermally imposed deformation without failure. This is accomplished by supporting one edge portion of each individual panel on an annular supporting member with a restraint against vertical, radial and circumferential movement, and by attaching the other edge portion of each panel to the next adjacent panel with restraint against only radial and vertical movement and with freedom to move in a circumferential direction.

As another aspect the space simulation chamber of the present invention includes a novel diffusion pump penetration for the thermal shroud that includes a shroud opening traversed by a plurality of space coolant conduits that serve to continue the cold wall sink effect of the thermal shroud across the pump penetration opening.

As another aspect of the present invention, the above mentioned diffusion pump penetration is provided with a novel cooling means for the pump outlet conduit at the shroud penetration zone. This construction also helps to continue the cold wall heat sink effect across the outlet opening at the pump penetration.

As still another aspect of the present invention, the above mentioned penetration for the thermal shroud is provided with baffle means for shielding the test specimen within the space chamber from hot radiation from inlet of the diffusion pump.

It is, therefore, an object of the present invention to provide an improved thermal shroud for a space simulation chamber that comprises three wall panel assemblies which are mounted within a space simulation chamber in a novel manner whereby the assemblies are thermally expandable and contractable relative to one another.

It is another object of the present invention to provide a thermal shroud construction made up of three wall panel assemblies that adjoin one another at optically tight junctions.

It is another object of the present invention to provide a thermal shroud construction that comprises wall panel assemblies the panels of which are individually expandable and contractable relative to one another.

It is another object of the present invention to provide a novel space simulation chamber that comprises an outer structural wall of spherical configuration within which is suspended a thermal shroud constructed of cylindrical and frusto-conical panel assemblies, the latter serving to simulate the characteristic of a cylindrical heat sink in a structurally practical arrangement adapted for cryogenic refrigeration.

It is another object of the present invention to provide a space simulation chamber of the type described that includes an outer structural wall lid and a top shroud wall panel assembly that are joined together for simultaneous removeability.

It is another object of the present invention to provide a space simulation chamber that includes a novel diffusion pump penetration for the thermal shroud wherein the pumping effect is concentrated on the inner test chamber within the shroud rather than the zone between the shroud and the outer structural wall. This results in obtaining pressure values, both within the shroud and within said outer zone, that are below the free molecular flow region of the gas. As a result, all molecular movement within the chamber is random thereby minimizing flow gradients from the entrapped warm gas at the inner surface of the outer structural wall to and through the thermal shroud.

It is still another object of the present invention to provide an apparatus of the type described that includes a novel diffusion pump penetration for the thermal shroud which provides free egress of gases from within the chamber and which at the same time serves to continue the cold wall heat sink effect across the pump penetration opening in the shroud.

Further objects and advantages of the present invention will be apparent from the following description, reference being had to the accompanying drawings wherein a preferred form of embodiment of the invention is clearly shown.

In the drawings:

FIG. 4 is a side sectional view of the thermal shroud comprising a portion of the chamber of the preceding figures, the section being taken along the line 4—4 of FIG. 3;

FIG. 5 is an enlarged broken sectional view of the thermal shroud of the preceding figures, the section being taken along the line 5—5 of FIG. 3;

FIG. 6 is a partial side elevational view of the thermal shroud of the preceding figures;

FIG. 7 is a side elevational view of a side wall panel of the shroud of FIG. 6;

FIG. 8 is a partial side elevational view, partially in section, showing a side wall panel mounting means incorporated in the shroud construction of the present invention;

FIG. 9 is a partial sectional view of a portion of the cryopumping panel incorporated in the shroud of the present invention, the section being taken along the line 9—9 of FIG. 10;

FIG. 10 is a partial top sectional view of the thermal shroud of the preceding figures, the section being taken along the line 10—10 of FIG. 6;

FIG. 10A is an enlarged top sectional view of a junction between adjacent panels of the shroud of the preceding figures, the section being taken along the line 10A—10A of FIG. 12;

FIG. 11 is a detailed sectional view showing the overlapping junction construction for the bottom wall panels of the shroud of the preceding figures;

FIG. 12 is a partial perspective view of the side wall panel assembly of the shroud of the preceding figures;

FIG. 25 is a plan view of a bottom or top closure member incorporated in the top and bottom wall panel assemblies of the shroud of the present invention;

FIG. 26 is a partial side sectional view of the structure of FIG. 25, the section being taken along the line 26—26 of FIG. 25;

FIG. 27 is a partial top view, partially in section of the structure of FIG. 25;

FIG. 28 is a perspective view of the space simulation chamber of FIG. 1 showing a thermal shroud and diffusion pump penetration constructed in accordance with the present invention;

FIG. 31 is a diagrammatic view of a refrigeration apparatus for use with the thermal shroud of the present invention.

Figure 1:
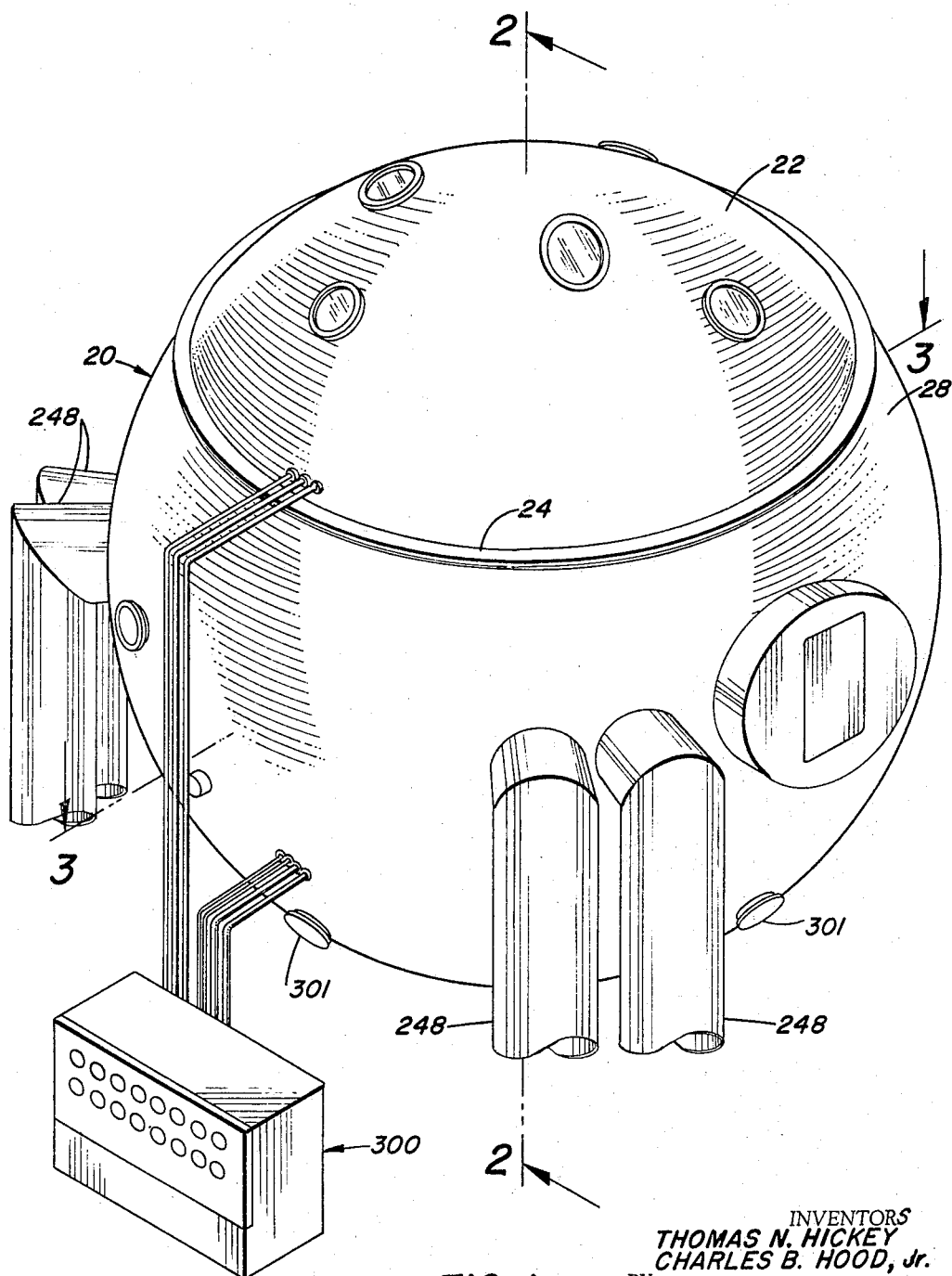
FIG. 1 is a perspective view of a space simulation chamber and thermal shroud constructed in accordance with the present invention.
Figure 2:
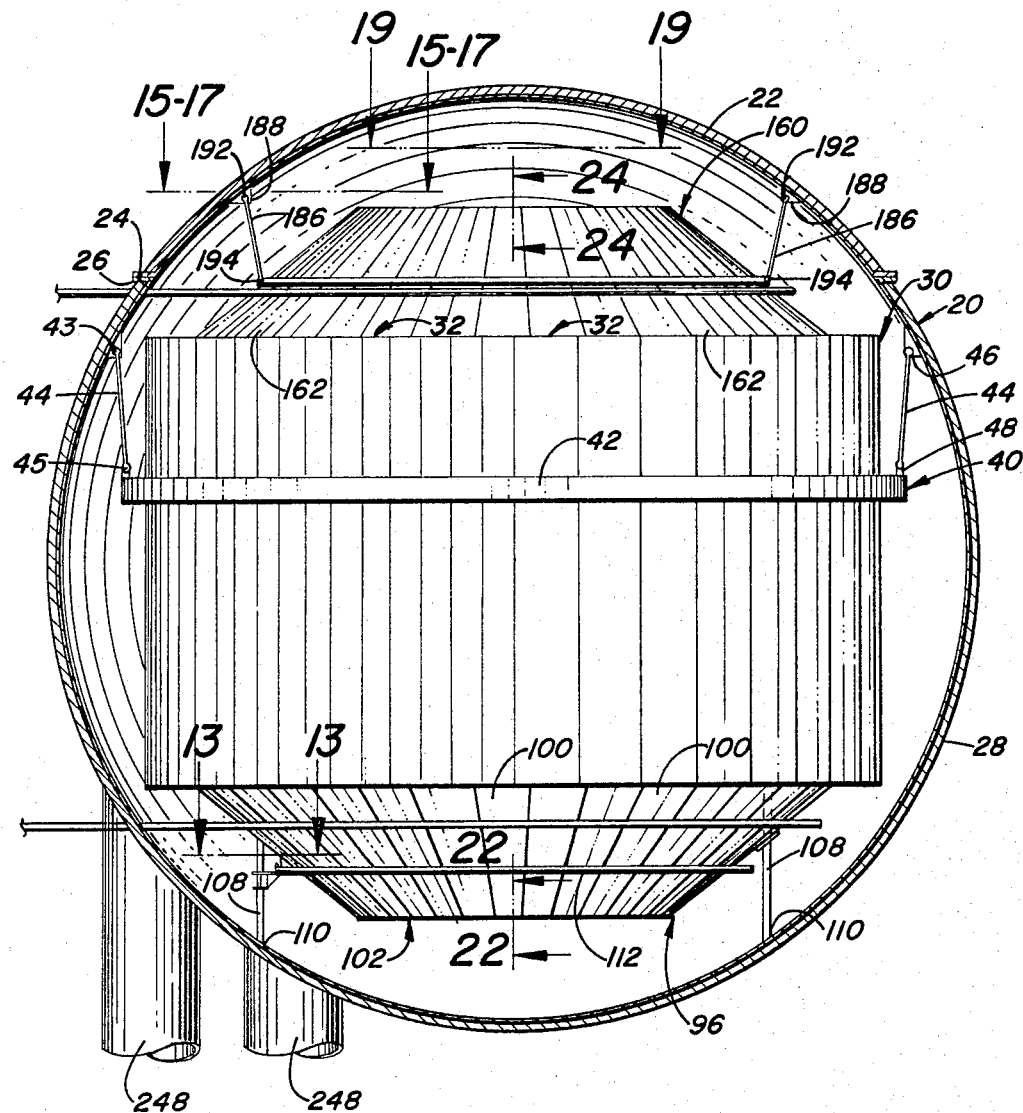
FIG. 2 is a side sectional view of the chamber of FIG. 1, the section being taken along the line 2—2 of FIG. 1.
Figure 3:
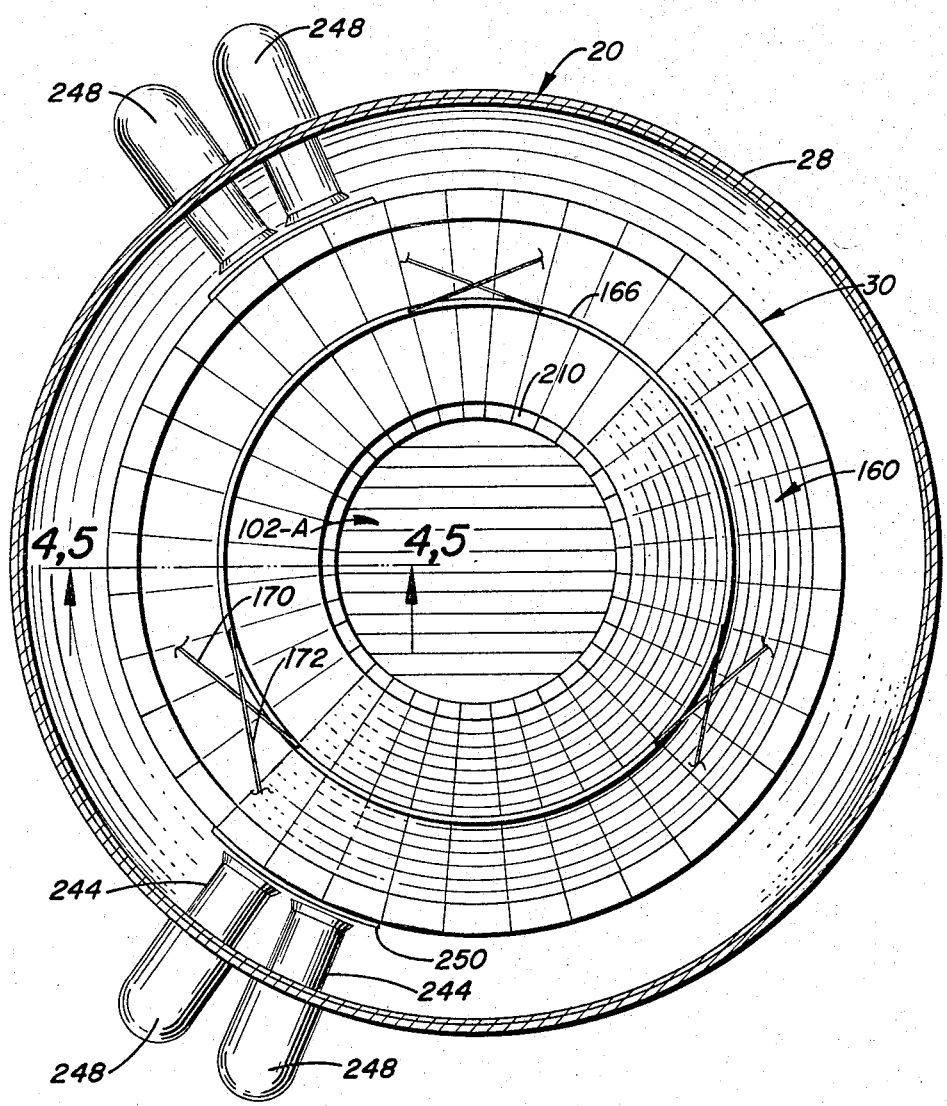
FIG. 3 is a top sectional view of the chamber of the preceding figures, the section being taken along the line 3—3 of FIG. 1.

Referring in detail to the drawings, FIGS. 1 through 3 illustrate a space simulation chamber constructed in accordance with the present invention that includes a main structural wall of spherical shape indicated generally at 20. The structural wall includes an upper portion in the form of a lid or removeable cover 22 provided with an annular flange 24 that overlies a second annular flange 26 on the top of a lower structural wall portion 28.

Structural wall 20 surrounds a cryogenic thermal shroud assembly indicated generally at 30, FIG. 2, that is made up of a side wall panel assembly, a top wall panel assembly, and a bottom wall panel assembly.

Referring to FIGS. 2 through 12, side wall panel assembly 30 includes a plurality of individual panels, each of which is indicated generally at 32, the complete plan view of the panel being shown in FIG. 6. Each panel includes a flat sheet metal portion 34 and integral tube portions 36, the latter being seen in cross section in FIG. 10.

Side wall panel assembly 30 is supported to outer structural wall 20 by a mounting means indicated generally at 40, FIGS. 6 through 8 and 12, in the form of an annular member 42 of U-shaped cross section that is suspended from structural wall 20 by a plurality of rods 44 that have pivotal end connections with outer structural wall brackets 46 and inner supporting brackets 48.

The structure for attaching side wall panels 32 to the mounting means 40 is best illustrated in FIGS. 6 through 8 and 12. It will be noted that one vertical edge of each panel includes a Z-shaped junction member 72 that includes an inner flange 49 welded to the edge of the panel and an outer flange 50 to which is welded a channel member 52.

As is best seen in FIG. 8, mounting means 40 further includes a radially extending angle 56 on the inner end of which is butt welded a plate 58 that in turn carries angle support 60 disposed in underlying relationship with the bottom of the previously mentioned channel member 52. A bolt and nut 62 attach a bottom plate 64 on the channel to angle support 60 as seen in FIG. 8.

Reference is next made to FIGS. 6 through 12 which illustrate in detail a very important aspect of the present invention wherein each of the panels 32 are rigidly supported along one vertical edge position, for restraint against three degrees of movement, that is, vertical, radial, circumferential movement, and wherein the other vertical edge position of each panel is anchored to the next adjacent panel against movement in only two directions while being free for movement in a third direction. That is to say the second vertical edge of each panel is restrained against movement in the vertical and radial directions but is free to move in the circumferential directions.

For a specific description of this unique mounting means reference is made to FIGS. 6 through 12 wherein it will be seen that the left edge portion of each of the side wall panels 32 includes a stiffener member indicated generally at 72, said stiffener being of Z-shaped cross section as seen in FIGS. 10, 10A, and 12. Each left stiffener member 72 is welded to the edge of the panel and to the inner flange of a U-bracket 52 which is bolted to bracket assembly 56, 58 and 60. As seen in FIGS. 8 and 12, a radially extending angle bracket 56 is welded to the upper surface of annular support members 42 and includes an inner end welded to plate 58.

It will now be understood that the left edge position of each panel 32, and the Z-shaped stiffener 72 welded thereon, are anchored to annular support member 42 so as to be restrained against movement in radial directions R—R, FIG. 8; vertical directions V—V, FIG. 8, and circumferential directions C—C, FIG. 10.

With continued reference to FIGS. 6 through 12, the right edges of each of the panels 32, as viewed in FIG. 12, include stiffeners indicated generally at 76 of L-shaped cross section which are welded to the right edges of the panels. Each of these stiffeners is joined to the next adjacent Z-shaped stiffener 72, previously described, by a bolt and collar assembly illustrated in detail in FIG. 10A. This fastening means provides an interpanel vertical junction that restrains inter-panel movement, in only one place at the radial axes of FIG. 12, in not only the radial directions R—R in FIG. 8, and the vertical directions V—V, FIG. 8, but also permits freedom of movement in the circumferential directions C—C as seen in FIGS. 10 and 10A.

This type of junction at the radial axis is formed at the radial axis, FIG. 10A, by extending a spacer collar 33 through holes 37 and 39 in the confronting flanges 74 and 75. Collars 33 fit snugly into holes to prevent vertical and radial movement between the panels but extend outwardly between the flanges 74 and 75 to permit circumferential movement between the panels. A washer 35 is provided at either end of collar 33 with a bolt 68 being extended through the collar, the latter being provided with a nut that clamps washers 35 against the ends of the collar in spaced relationship with flanges 74 and 75.

With reference to FIG. 8, stiffener members 72 and 76 are joined together above and below their central registered hole junctions at the above mentioned radial axis previously described, by bolt and nut assemblies 68 that extend through a slot 70 in one of the stiffener members and a confronting hole in the other stiffener member. It will now be understood that slots 70 permit relatively vertical movement at the panel junctions, at locations above and below the radial axis, under thermally imposed contraction and expansion.

With reference to FIG. 6, it should be pointed out that coolant tubes 36, integrally formed with the panels 32, are manifolded, panel to panel, by U-shaped jumper tubes 94 inserted into the ends of coolant tubes 36 and joined thereto at sealed welded junctions.

It should be pointed out that jumper tubes 94, being made of flexible tubing, permit inter-panel relative movement when the array of panels undergoes thermal contraction or thermal expansion.

Since the left end of each panel is anchored at the radial axis against movement in three directions, the right edge of each panel is anchored against movement in only two directions at said axis and since the fastener holes 70 in stiffener 72 are slotted, as previously described, it will be understood that when the assembly of panels contract or expand relative movement will occur between the confronting stiffeners 72 and 76, both above and below the radial axis, with the maximum displacement occurring at the upper and lower regions of the junctions. This causes a low acceptable tortional movement T around the radial axes, FIG. 12, and a low acceptable bending movement along the jumper tubes 94 that interconnect the panel coolant tubes.

In view of the above, it will be understood that the thermal shroud, although of relatively light construction, possesses high structural integrity in that the assembly is adapted to yield, with relative movement between joined components, in a novel manner without excessive stress concentrations at any particular locations.

With reference to FIGS. 9 and 10, the inner surfaces of the side wall panels 32 support cryopumping panel assemblies indicated generally at 80. A typical cryopumping panel construction is described in detail in the co-pending application of James G. Pierce, Serial No. 216,602, filed October 31, 1962.

In general, these pumping panel assemblies 80 include a radiation shield portion 82 and a refrigerated panel portion 84, the latter being mounted to the former by a plastic rod 86, FIG. 9, and a plastic spacer collar 88, said rod and collar being formed of plastic material of low thermal conductivity. The assembly is retained together by conventional speed nuts 90.

The previously described intergrally formed tubes 36, FIGS. 6 and 12, form the coolant conduits for the flow of refrigerant through and between the panels and are joined by a plurality of U-shaped tubes 94, the ends of the latter being inserted in the ends of tubes 36.

Reference is next made to the bottom wall panel assembly of the heat sink indicated generally at 96 in FIG. 2. The details of this assembly, and the mounting means therefor, are shown in detail in FIGS. 4, 5, 13, 14, 22, 23 and 25.

Bottom wall panel assembly 96 includes a plurality of individual panels 100 joined together in a frustoconical array and a bottom cover indicated generally at 102, the latter being best illustrated in FIG. 25.

Figure 13:
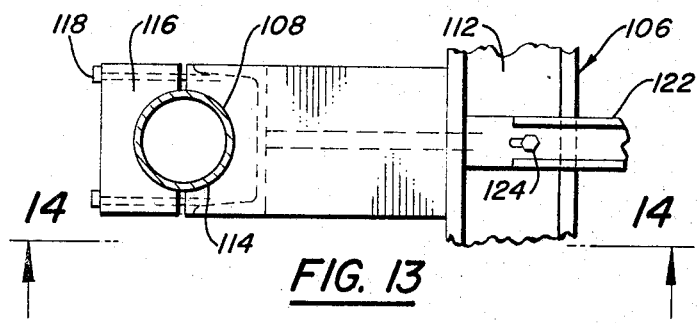
FIG. 13 is a top view of a portion of the mounting means for the bottom wall panel assembly of the shroud of the preceding figures.

The bottom wall panels are joined together in thermally expandable relationship with the same construction previously described in connection with side wall panels 32 and the array is supported by a mounting means indicated generally at 106, FIGS. 13 and 14, which mounting means comprises a plurality of column members 108 the lower ends 110 of which are secured to the inner surface of outer structural wall 20.

Figure 14:
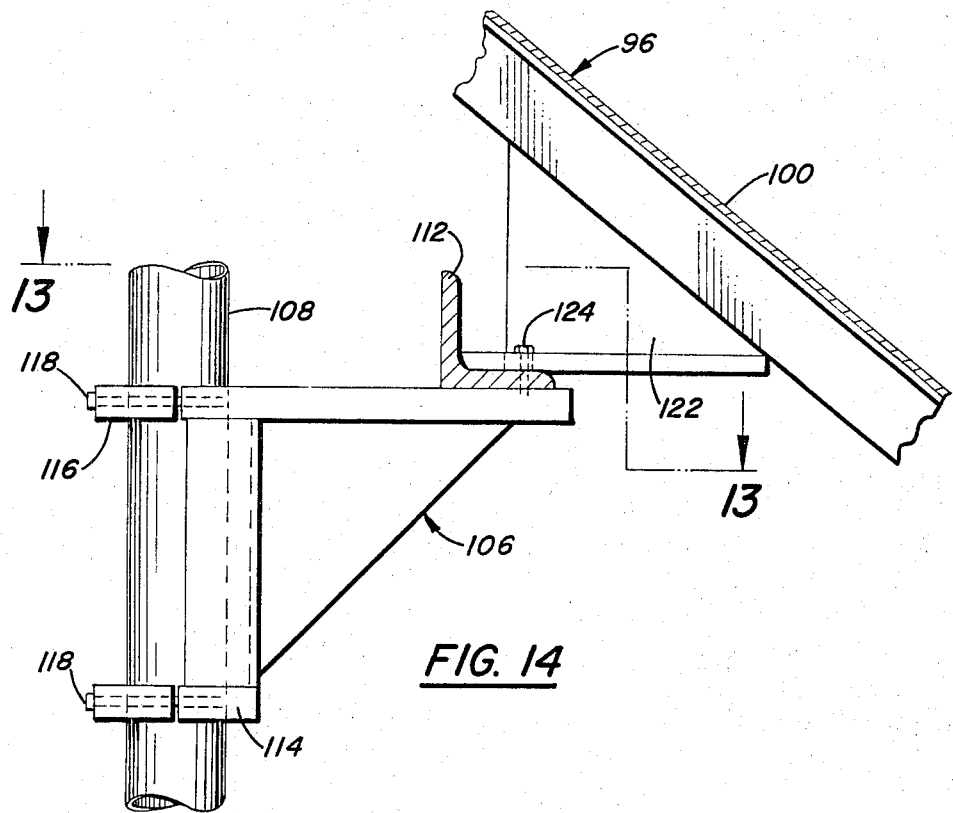
FIG. 14 is a side elevational view of the mounting means of FIG. 13.
Figure 15:
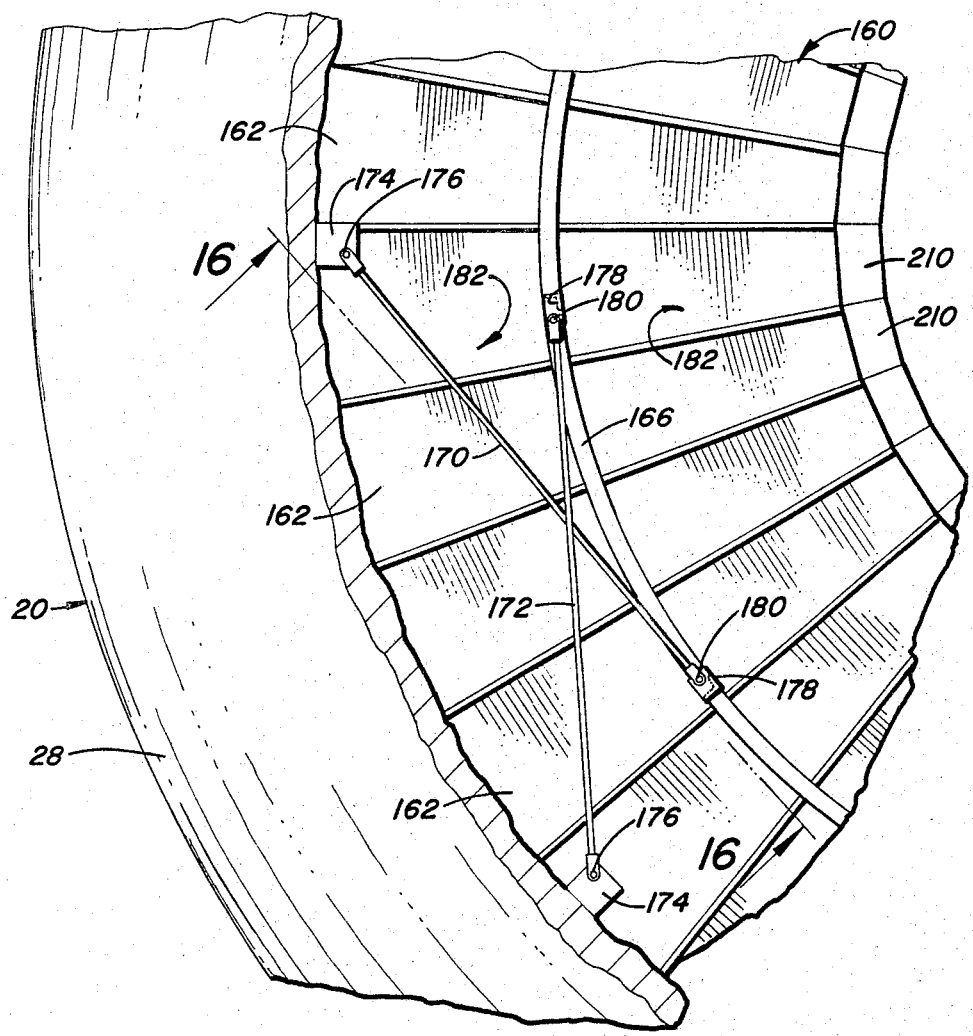
FIG. 15 is a partial top sectional view showing the mounting means for the top wall panel assembly for the shroud of the preceding figures, the section being taken along the line 15—15 of FIG. 2.
Figure 16:
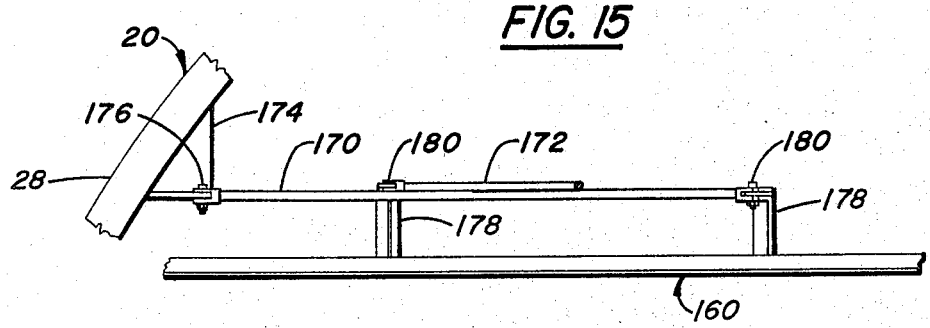
FIG. 16 is an end view, partially in section, showing the mounting means of FIG. 15, the section being taken along the line 16—16 of FIG. 15.
Figure 17:
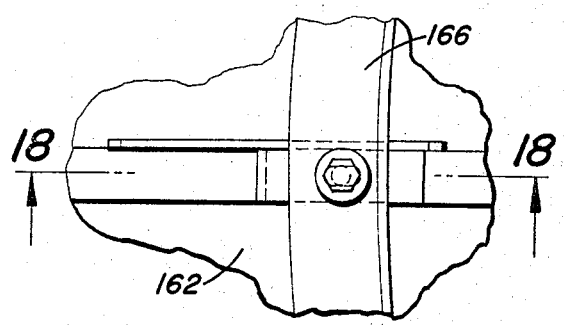
FIG. 17 is a partial top elevational view of the mounting means for the top wall panel assembly, the section being taken along the line 17—17 of FIG. 2.

The columns 108 support a ring mount or annular member 112, FIGS. 2 and 14, that includes flange portions 114 and 116 that are clamped to the column by studs 118.

The panels 100 are joined directly to ring shaped member 112 by triangular brackets 122, the latter being fastened to the former by bolts 124.

Figure 22:
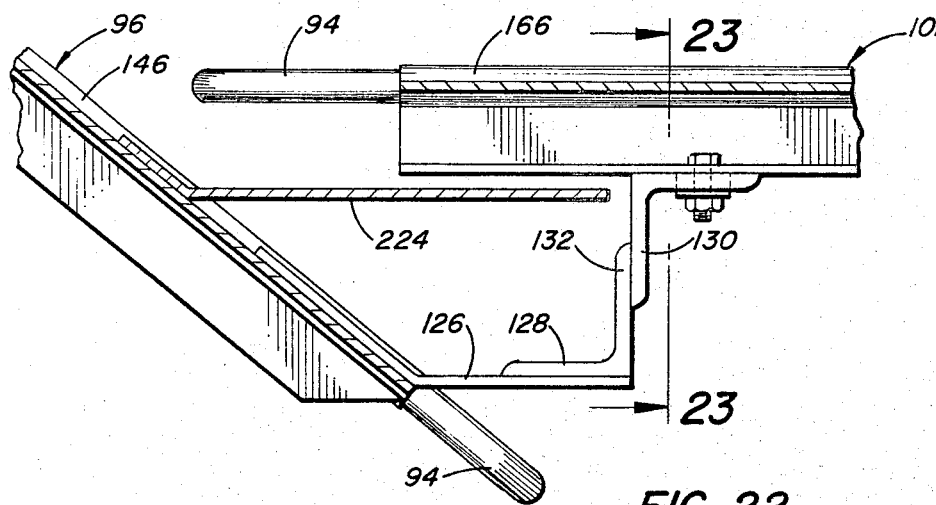
FIG. 22 is a partial side sectional view of the wall panel assembly; the section being taken along the line 22—22 of FIG. 2.

Referring next to FIGS. 2, 22 and 25, bottom cover 102 is supported by inturned flanges 126 welded to the bottom edges of panels 100. The flanges underlie angles 128 and 130, the latter being welded together at a junction 132.

Figure 23:
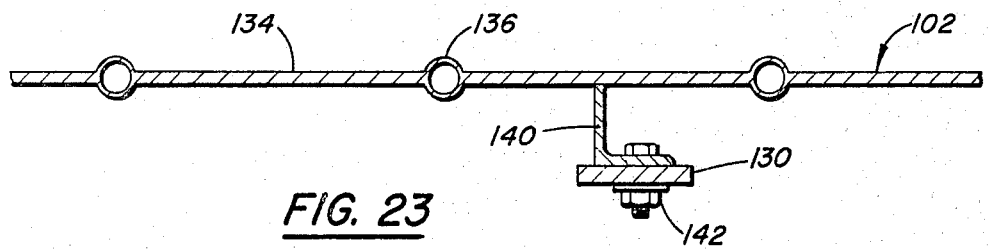
FIG. 23 is a partial sectional view of the bottom wall panel assembly of FIG. 22, the section being taken along the line 23—23 of FIG. 22.

With reference to FIG. 23, bottom cover 102 comprises sheet metal panel portions 134, integrally formed coolant tubes 136, and angle brackets 140 that are secured to the previously mentioned angles 130, FIG. 22, by bolt and nut assemblies 142.

As is best seen in FIG. 27, coolant tubes 136 have their ends connected by U-shaped conduit members 94 and, similarly, the bottom wall panels 96, FIG. 22, include integral coolant tubes 136 the ends of which are connected by U-shaped conduit members 94.

Reference is next made to the top wall panel assembly for the thermal shroud indicated generally at 160 in FIG. 2 that includes a plurality of top wall panels 162 and a top cover 102–A, the latter being the same as the bottom cover 102 of FIG. 25 except that the top cover is inverted.

The mounting means for the top wall frusto-conical array 160 is illustrated in detail in FIGS. 15 through 21 and includes a top wall support ring 166 that is suspended from the outer shell by a plurality of cross rods 170 and 172 which are attached to outer brackets 174 at pivots 176 and to shroud brackets 178 at pivot pins 180. This permits radial expansion and contraction of annular ring 166 and the top wall array with arcuate movement of the pivot centers 180 as is indicated by arrows 182 in FIG. 15.

Figure 20:
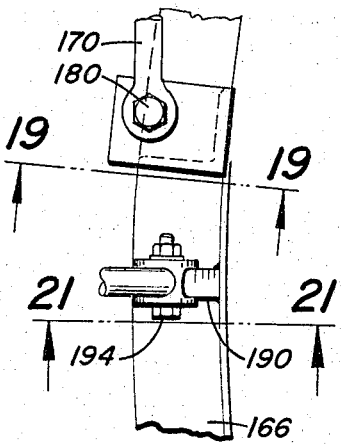
FIG. 20 is another partial top elevational view of the top wall mounting means.
Figure 18:
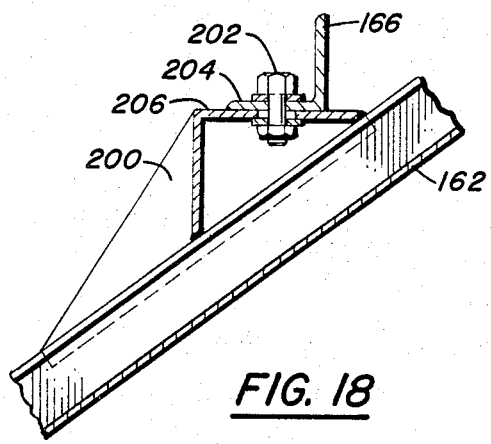
FIG. 18 is a partial side sectional view showing the top wall mounting means of FIG. 17, the section being taken along the line 18—18 of FIG. 17.
Figure 21:
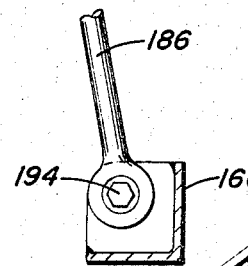
FIG. 21 is another partial side sectional view of the top wall mounting means, the section being taken along the line 21—21 of FIG. 20.
Figure 19:
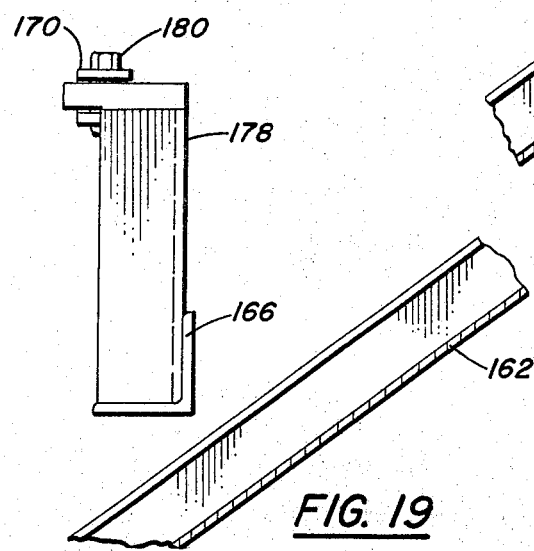
FIG. 19 is another side sectional view of the top wall mounting means of FIGS. 17 and 18, the section being taken along the line 19—19 of FIG. 20.

With particular reference to FIGS. 7 and 17 through 21, the top wall support ring 166 is suspended from outer shell 20 by means of a plurality of rods 186 that are attached to outer shell brackets 188, FIG. 2, and support ring brackets 190, FIG. 20, at the pivots 192 and 194, respectively.

Each of the top wall panels 162 is attached to support ring 166 by a bracket 200 and a bolt and nut 202, the latter being passed through holes in confronting flanges 204 and 206.

Figure 24:
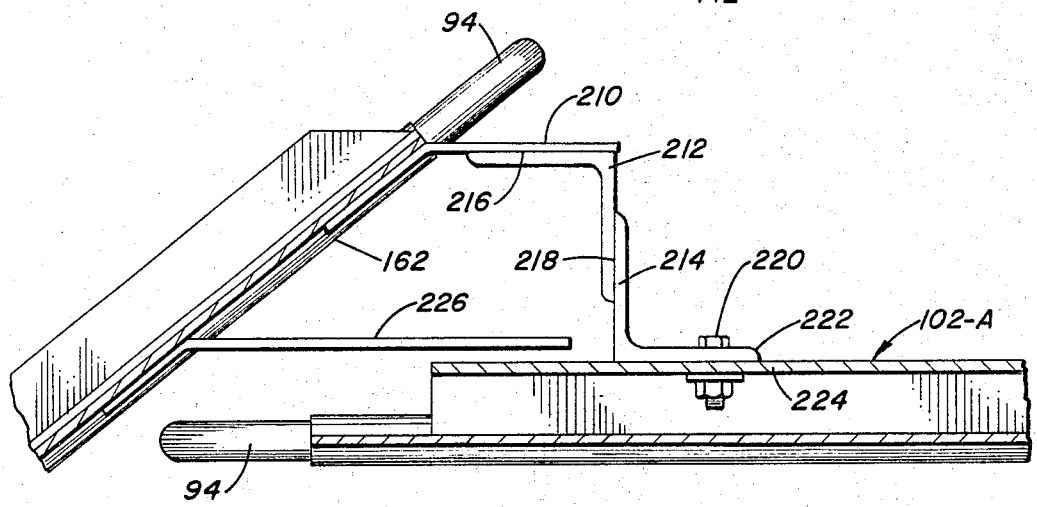
FIG. 24 is a partial side sectional view of the top wall panel assembly, the section being taken along the line 24—24 of FIG. 2.

Reference is next made to FIG. 24 which illustrates the junction of top wall panel assembly 160 with previously mentioned top cover 102–A. This structure comprises the radially inwardly extending flange 210, angles 212 and 214, the latter being joined at welded junctions 217 and 218. The bottom flange of angle 214 is secured to bottom cover 102–A by a bolt and nut 220 that joins the confronting flanges 222 and 224.

Reference is next made to FIGS. 4 and 5 which illustrate in detail the overlapping flange constructions which provide optical tight junctions between the side wall panel assembly 30 and the top and bottom wall panel assemblies 160 and 96.

Here it will be seen that the side wall panels include radially inwardly extending flanges 210 provided with overlapping edges 212 and 214, FIG. 11, and lower flanges 216 which include the same overlapping edge construction illustrated in detail in FIG. 11.

The flanges 210 and 216, FIGS. 4 and 5, extend radially inwardly beyond the outer edges of flanges 220 on the top wall array 160 and beyond flanges 222 on the bottom wall array 96 respectively.

With reference to FIGS. 22 and 24, the optical density between top cover 102 is enhanced by the radially inwardly extending flange 224 and similarly, the junction between the top wall array 162 and top cover 102–A is enhanced by a radially inwardly extending flange 226.

Figure 29:
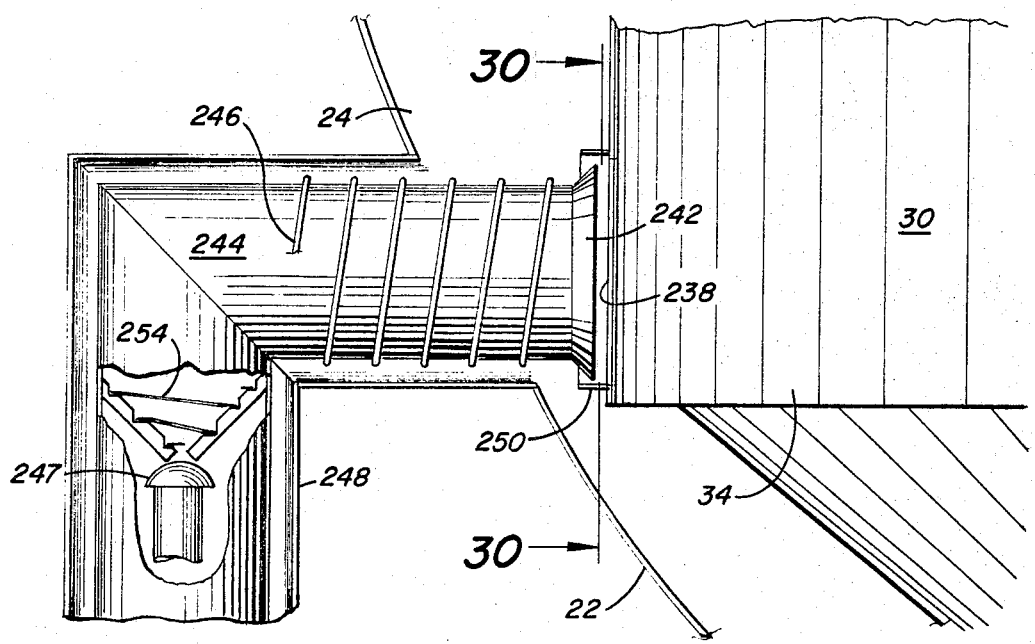
FIG. 29 is a partial side sectional view of the diffusion pump penetration of FIG. 28, the section being taken along the line 29—29 of FIG. 28.
Figure 30:
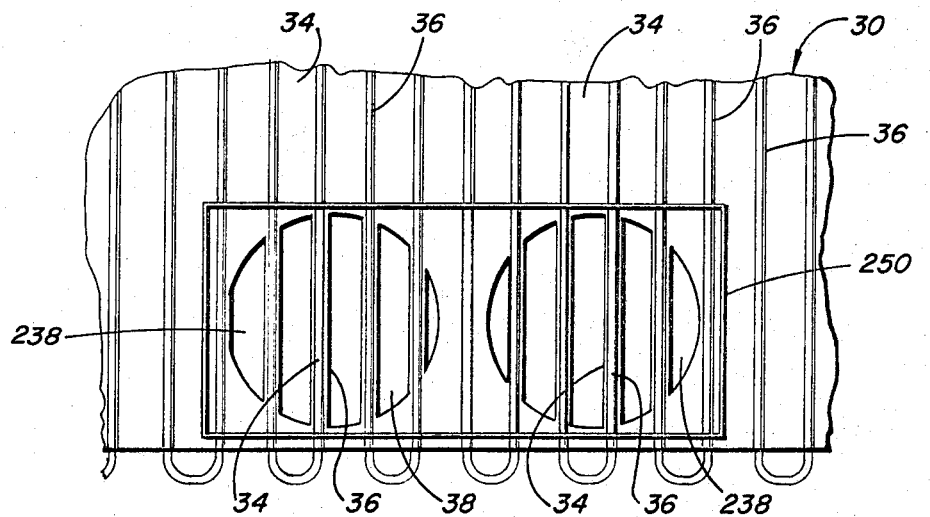
FIG. 30 is a partial front elevational view of the diffusion pump penetration of FIGS. 28 and 29.

Reference is next made to FIGS. 28–30 which illustrate a diffusion pump shroud penetration comprising another aspect of the chamber construction of the present invention. As previously described, shroud side wall panel assembly 30 includes a plurality of conduit lengths 36 in heat exchange relationship with panels 32, said conduit lengths and wall portions being spaced from one another to form openings 238 shown in FIGS. 29 and 30.

In the preferred embodiment of the invention conduit lengths 36 and sheet metal panel portions 34 are integrally formed by a tube-in-wall construction of the type where the tubes and interconnecting shroud wall portions are integrally formed and the openings 238 are formed by cutting into the shroud wall portions lying between the conduit lengths with the cutouts being made to conform with the round shape of an inlet 242 of a pump conduit indicated generally at 244.

As is best seen in FIG. 29, pump conduit 244 is spirally wound with a coolant tube 246 that is connected in circuit with a suitable refrigeration system, not illustrated.

A vacuum jacket 248 surrounds pump conduit 244 and an inlet 247 of the diffusion pump. An outwardly extending flange 250 is mounted to the thermal shroud in surrounding relationship with the inlet 242 of pump conduit 244.

Referring again to FIG. 29, a cooled optically tight baffle means indicated generally at 254 is mounted in pump conduit 244 between the inlet 242 of the conduit and the diffusion pump for the purpose of preventing the backstreaming of oil from the inlet 247 of the diffusion pump to the interior of the test chamber.

A suitable construction for baffle means 254 is my co-pending application Serial No. 216,604, filed October 31, 1962, now Patent No. 3,122,896 granted March 3, 1964.

In operation, reference is next made to FIG. 31 which diagrammatically illustrates the major components of the space simulation chamber of the present invention and the cooling system and controls for refrigerating same.

At the outset of operation the chamber within the outer structural wall 20 is evacuated by the previously described diffusion pump to extremely low pressure ranges in the neighborhood of $1 \times 10^{-5}$ millimeters of mercury which are within the free flow region of the gas molecules.

A subcooler 304, FIG. 31, is next started whereby a flow of liquid nitrogen is delivered through line 306 to the wall panel assemblies and covers, previously described, and the coolant is passed through the integrally formed coolant tubes 36 whereby the walls are cooled to 100 degrees Kelvin.

The side wall panel assembly 30 receives liquid nitrogen via line 306 and a plurality of parallel passes 310 through the side wall panel assembly, the liquid nitrogen being returned to subcooler 304 via line 311, one of the valves 312, and line return 314 back to subcooler 304.

Top lid 102–A receives liquid nitrogen from line 306, the flow being returned to the subcooler via line 316, one of the valves 312, and return line 314.

Similarly, bottom lid 102 receives the flow of liquid nitrogen from line 306 with the flow being returned via a line 318, one of the valves 312, and return line 314.

Bottom wall panel assembly 96 and top wall panel assembly 160 receive flows of liquid nitrogen from line 306, said flows being returned to the subcooler 304 via lines 320 and 322, valves 312 and return line 314.

Side wall panel assembly 30 constitutes a cold wall in that the previously described cryopumping panels 80, mounted on the inner surface of the shroud wall, are cooled with gaseous helium supplied by a helium refrigerator that comprises a right hand refrigeration cycle 324 and a left hand refrigeration cycle 326. These supply flows of liquid helium through lines 327 and 329 to the cryopumping panel array 80, the reversal in flow direction being accomplished by selectively controlling shut-off valves 328 through 338.

It should be pointed out that the components of the shroud that are cooled with liquid nitrogen, via supply line 306, are cooled down to 100 degrees Kelvin whereas the array of cryopumping panels 80 is subsequently cooled down to 20 degrees Kelvin after the panel assemblies have been first cooled by the liquid nitrogen.

The liquid nitrogen distribution panel 300, diagrammatically illustrated in FIG. 31, also appears in the overall assembly view of FIG. 1 and, if desired, a remote control console 340, FIG. 31, can be incorporated with the main panel 300.

The numbers from 1–24 appearing in the table of panel 300, which numbers also appear enclosed in squares at various locations on the diagram, each designates a location of a thermocouple which feeds information to panel 300 as to the existing temperature at the particular location.

Distribution panel 300 further includes a thermocouple selector switch 342 which permits selectively taking temperature readings at any of the system locations 1–24.

While the form of embodiment of the present invention as herein disclosed constitutes a preferred form, it is to be understood that other forms might be adopted, all coming within the scope of the claims which follow.

We claim:
1. A space simulation chamber comprising, in combination, an outer structural wall; a thermal shroud within said structural wall, said shroud comprising in combination, a plurality of side wall panel assemblies each of said assemblies including a plurality of adjoining refrigerated side wall panels; yieldable connecting means between adjoining edges of said side wall panels; yieldable connecting means between adjoining edges of said side wall panels; means for passing refrigerated fluid between said side wall panels; a plurality of support rods attaching said side wall panels to the structural wall of said space simulation chamber; a plurality of adjoining refrigerated top wall panels; top wall mounting means attaching said top wall panels to the structural wall of said space simulation chamber; a plurality of refrigerated bottom wall panels; and bottom wall mounting means for attaching said bottom wall panels to the structural wall of said space simulation chamber.

2. A space simulation chamber comprising, in combination, an outer structural wall; a thermal shroud within said structural wall, said shroud comprising in combination, a plurality of side wall panel assemblies each of said assemblies including a plurality of adjoining refrigerated side wall panels including flanged end portions; yieldable connecting means between adjoining edges of said side wall panels; means for passing refrigerated fluid between said side wall panels; a plurality of support rods attaching said side wall panels to the structural wall of said space simulation chamber; a plurality of adjoining refrigerated top wall panels; top wall mounting means attaching said top wall panels to the structural wall of said space simulation chamber; a plurality of refrigerated bottom wall panels, said top and bottom wall panels including flanged end portions disposed in overlapping relationship with flanged end portions of said wall panels; and bottom wall mounting means for attaching said bottom wall panels to the structural wall of said space simulation chamber.

3. A space simulation chamber comprising, in combination, an outer structural wall; a thermal shroud within said structural wall, said shroud comprising in combination, a plurality of side wall panel assemblies, each of said assemblies including a plurality of adjoining refrigerated side wall panels; yieldable connecting means between adjoining edges of said side wall panels; means for passing refrigerated fluid between said side wall panels; a plurality of support rods attaching said side wall panels to the structural wall of said space simulation chamber; a plurality of adjoining refrigerated top wall panels; top wall mounting means attaching said top wall panels to the structural wall of said space simulation chamber; a plurality of refrigerated bottom wall panels; and bottom wall mounting means for attaching said bottom wall panels to the structural wall of said space simulation chamber, certain of said adjoining panels including confronting side flanges provided with holes that register with one another, certain of said openings defining slots; and fasteners extended through said slots for joining the confronting sides of said panels in relatively moveable relationship.

4. A space simulation chamber comprising, in combination, an outer structural wall; a thermal shroud within said structural wall, said shroud comprising in combination, a plurality of side wall panel assemblies each of said assemblies including a plurality of adjoining refrigerated side wall panels including flanged end portions; yieldable connecting means between adjoining edges of said side wall panels; means for passing refrigerated fluid between said side wall panels; a plurality of support rods attaching said side wall panels to the structural wall of said chamber; a plurality of adjoining refrigerated top wall panels; top wall mounting means attaching said top wall panels to the structural wall of said space simulation chamber; a plurality of refrigerated bottom wall panels, said top and bottom wall panels including flanged end portions disposed in overlapping relationship with flanged end portions of said wall panels; and bottom wall mounting means for attaching said bottom wall panels to the structural wall of said space simulation chamber, certain of said adjoining panels including confronting side flanges provided with holes that register with one another, certain of said openings defining slots; and fasteners extended through said slots for joining the confronting sides of said panels in relatively moveable relationship.

5. A cryogenic thermal shroud for a space simulation chamber, said shroud comprising in combination, a plurality of adjoining refrigerated side wall panels; side wall mounting means attaching said side wall panels to the structural wall of said space simulation chamber; a plurality of adjoining refrigerated top wall panels; top wall mounting means attaching said top wall panels to the structural wall of said chamber; a plurality of refrigerated bottom wall panels; bottom wall mounting means for attaching said bottom wall panels to the structural wall of said space simulation chamber, certain of said wall mounting means including an annular member in surrounding supporting relationship with one of said plurality of wall panels; and a plurality of support rods connecting said annular member to the structural wall of said space simulation chamber, the longitudinal axis of certain of said support rods being disposed in diagonally extending crossed relationship to permit thermal expansion and contraction of said shroud.

6. A cryogenic thermal shroud for a space simulation chamber, said shroud comprising, in combination, a plurality of adjoining refrigerated side wall panels including flanged end portions; side wall mounting means attaching said side wall panels to the structural wall of said space simulation chamber; a plurality of adjoining refrigerated top wall panels; top wall mounting means attaching said top wall panels to the structural wall of said space simulation chamber; a plurality of refrigerated bottom wall panels, said top and bottom wall panels including flanged end portions disposed in overlapping relationship with flanged end portions of said wall panels; bottom wall mounting means for attaching said bottom wall panels to the structural wall of said space simulation chamber, certain of said wall mounting means including an annular member in surrounding supporting relationship with one of said plurality of wall panels; and a plurality of support rods connecting said annular member to the structural wall of said space simulation chamber, the longitudinal axes of certain of said support rods being disposed in diagonally extending crossed relationship to permit thermal expansion and contraction of said shroud.

7. A cryogenic thermal shroud for a space simulation chamber, said shroud comprising, in combination, a plurality of adjoining refrigerated side wall panels; side wall mounting means attaching said side wall panels to the structural wall of said space simulation chamber; a plurality of adjoining refrigerated top wall panels; top wall mounting means attaching said top wall panels to the structural wall of said space simulation chamber; a plurality of refrigerated bottom wall panels; bottom wall mounting means for attaching said bottom wall panels to the structural wall of said space simulation chamber, certain of said adjoining panels including confronting side flanges provided with holes that register with one another, certain of said openings defining slots; fasteners extended through said slots for joining the confronting sides of said panels in relatively moveable relationship, certain of said wall mounting means including an annular member in surrounding supporting relationship with one of said plurality of wall panels; and a plurality of support rods connecting said annular member to the structural wall of said chamber, the longitudinal axes of certain of said support rods being disposed in diagonally extending crossed relationship to permit thermal expansion and contraction of said shroud.

8. A cryogenic thermal shroud for a space simulation chamber, said shroud comprising in combination, a plurality of adjoining refrigerated side wall panels including flanged end portions; side wall mounting means attaching said side wall panels to the structural wall of said space simulation chamber; a plurality of adjoining refrigerated top wall panels; top wall mounting means attaching said top wall panels to the structural wall of said space simulation chamber; a plurality of refrigerated bottom wall panels, said top and bottom wall panels including flanged end portions disposed in overlapping relationship with flanged end portions of said wall panels; bottom wall mounting means for attaching said bottom wall panels to the structural wall of said space simulation chamber, certain of said adjoining panels including confronting side flanges provided with holes that register with one another, certain of said openings defining slots; fasteners extended through said slots for joining the confronting sides of said panels in relatively moveable relationship, certain of said wall mounting means including an annular member in surrounding supporting relationship with one of said plurality of wall panels; and a plurality of support rods connecting said annular member to the structural wall of said space simulation chamber, the longitudinal axes of certain of said support rods being disposed in diagonally extending crossed relationship to permit thermal expansion and contraction of said shroud.

9. A space simulation chamber of the type including a diffusion pump and refrigerating means comprising, in combination, an outer structural wall of substantially spherical configuration; a plurality of thermal shroud side wall panel assemblies each of said assemblies comprising a plurality of panels joined together in side by side relationship; yieldable connecting means between adjoining edges of said side wall panels means for passing refrigerated fluid between said side wall panels; a plurality of support rods for suspending said side wall panel assembly from the inner surface of said structural wall; a shroud bottom wall panel assembly of substantially frusto-conical configuration; means for supporting said shroud bottom wall panel assembly within said structural wall; a top shroud wall panel assembly of substantially frusto-conical configuration; means for suspending said shroud top wall panel assembly from the inner surface of said structural wall; and conduit means on certain of said panel assemblies for refrigerating said shroud.

10. The space simulation chamber defined in claim 9 wherein said outer structural wall includes a removeable cover portion and wherein said shroud top wall panel assembly is suspended from said removeable cover portion.

11. A space simulation chamber of the type including a diffusion pump and refrigerating means comprising, in combination, an outer structural wall of substantially spherical configuration; a thermal shroud side wall panel assembly comprising a plurality of panels joined together in side by side relationship; yieldable connecting means between adjoining edges of said side wall panels means for passing refrigerated fluid between said side wall panels; a plurality of support rods for suspending said side wall panel assembly from the inner surface of said structural wall, said means including an annular member in surrounding supporting relationship with the panels of said assembly; a shroud bottom wall panel assembly of substantially frusto-conical configuration; means for supporting said shroud bottom wall panel assembly within said structural wall, said means including an annular member in surrounding supporting relationship with the panels of said assembly; a top shroud wall panel assembly of substantially frusto-conical configuration; means for suspending said shroud top wall panel assembly from the inner surface of said structural wall, said means including an annular member in surrounding supporting relationship with the panels of said assembly; and conduit means on certain of said panel assemblies and operatively connected to said refrigerating means for refrigerating said shroud.

12. The space simulation chamber defined in claim 11 wherein said outer structural wall includes a removeable cover portion and wherein said shroud top wall panel assembly is suspended from said removeable cover portion.

13. A space simulation chamber of the type including a diffusion pump comprising, in combination, an outer structural wall; a plurality of shroud side wall panels joined together in side by side relationship; yieldable connecting means between adjoining edges of said side wall panels means for passing refrigerated fluid between said side wall panels; a plurality of support rods mounting said shroud side wall panels to said outer structural wall; a top cover means; an upper assembly of inwardly and upwardly extending panels joined together in side by side relationship and including a lower flange means disposed in optically tight relationship with said side wall panel assembly and an upper flange disposed in optically tight relationship with said top cover means; a bottom cover means; an assembly of upwardly and outwardly inclined panels joined together in side by side relationship and including an upper flange in optically tight relationship with said side panel assembly and a lower flange in optically tight relationship with said bottom cover means; and means for refrigerating said panel assemblies and cover means.

14. The space simulation chamber defined in claim 13 wherein said outer structural wall includes a removeable lid and wherein said assembly of upwardly and inwardly inclined panels and top cover means are supported by said lid for concurrent removal therewith.

15. The space simulation chamber defined in claim 14 wherein certain of said panel assemblies include means for joining confronting panel edges for thermally imposed relative movement.

16. The space simulation chamber defined in claim 9 wherein certain of said panel assemblies include means for joining confronting panel edges for thermally imposed relative movement.

17. The space simulation chamber defined in claim 11 wherein certain of said panel assemblies include means for joining confronting panel edges for thermally imposed relative movement.

18. A space simulation chamber comprising, in combination, refrigerating means; an outer structural wall forming a housing; a thermal shroud side wall panel assembly mounted within said housing; yieldable connecting means between adjoining edges of said side wall panels; a thermal shroud top wall panel assembly mounted within said housing; a thermal shroud bottom wall panel assembly mounted within said housing, certain of said panel assemblies including a diffusion pump penetration opening; refrigerant conduit means operatively connected to said refrigerating means and including a plurality of spaced conduit lengths extended across said opening and in heat exchange relationship with said shroud wall; and a pump conduit including an inner end within said outer structural wall and confronting said opening and an outer end for connection with the inlet of a diffusion pump.

19. The apparatus defined in claim 18 wherein said pump conduit is surrounded by sealed jacket means; and a coolant tube within said jacket means and in heat exchange relationship with said pump conduit.

20. The apparatus defined in claim 18 wherein a baffle means is disposed within said pump conduit for shielding the interior of said shroud from radiation from the inlet of said diffusion pump.

21. A space simulation chamber of the type including a diffusion pump and refrigerating means comprising, in combination, an outer structural wall forming a sealed chamber; an annular shroud supporting means suspended within said sealed chamber; a shroud wall including a panel assembly comprising a plurality of individual panels joined in edge to edge relationship, each of said panels including coolant tubes; means for individually supporting certain of said panels on said annular shroud supporting means; a plurality of jumper tubes extending between adjacent panels and joining said coolant tubes, one of said panels including an edge provided with a stiffener member that includes a first outwardly extending flange; a second stiffener member on the confronting edge of a next adjacent panel, said second stiffener member including a second outwardly extending flange in lap joined relationship with said first flange; and a third flange overlying the junction of said first and second mentioned flanges to provide optical density at said junction.

22. A space simulation chamber of the type including a diffusion pump and refrigerating means comprising, in combination, an outer structural wall forming a sealed chamber; an annular shroud supporting means suspended within said sealed chamber; a shroud wall including a panel assembly comprising a plurality of individual panels joined in edge to edge relationship, each of said panels including integrally formed coolant tubes; means for individually supporting certain of said panels on said annular shroud supporting means; a plurality of jumper tubes extending between adjacent panels and joining said coolant tubes, one of said panels including an edge provided with a stiffener member that includes a first outwardly extending flange; a second stiffener member on the confronting edge of a next adjacent panel, said second stiffener member including a second outwardly extending flange in lap-joined relationship with said first flange; and a third flange overlying the junction of said first and second mentioned flanges to provide optical density at said junction.

23. The space simulation chamber defined in claim 21 that includes a second assembly of panels of frusto-conical configuration forming a top closure for said shroud wall; and a third assembly of panels of frusto-conical configuration forming a bottom closure for said shroud wall.

24. A space simulation chamber of the type including a diffusion pump and refrigerating means comprising, in combination, an outer structural wall forming a sealed chamber; an annular shroud supporting means suspended within said sealed chamber; a shroud wall comprising a first panel including a first vertical edge portion rigidly anchored to said annular supporting means against radial vertical, and circumferential movement when subjected to thermally imposed contraction and expansion, said first panel including a second edge portion; and a second panel including a first vertical edge portion rigidly anchored to said annular shroud supporting means against radial, vertical and circumferential movement when subjected to thermally imposed contraction and expansion, said second edge of said first panel being anchored to said first edge portion of said second panel against vertical and radial movement by confronting stiffener flanges provided with registered holes, a spacer collar extended through said holes, and a fastener extended through said collar.

25. The space simulation chamber defined in claim 24 wherein each of said panels include a coolant tube; and a plurality of jumper tubes extending between adjacent panels and joining said coolant tubes.

References Cited by the Examiner
UNITED STATES PATENTS

| 1,076,595 | 10/1913 | McMartin | 138—159 |
| 2,081,197 | 5/1937 | Goeller | 138—159 X |
| 2,366,376 | 1/1945 | Young et al. | 165—67 X |
| 2,934,257 | 4/1960 | Power | 62—100 |
| 3,015,231 | 1/1962 | Ganahl | 73—116 |
| 3,048,928 | 8/1962 | Copson et al. | 62—268 |
| 3,130,562 | 4/1964 | Wood et al. | 62—100 X |

OTHER REFERENCES

Publication: Space Simulation Chamber, Model 8484, High Vacuum Equipment Corporation, Hingham, Mass., Sept. 19, 1962.

ROBERT A. O'LEARY, *Primary Examiner.*

CHARLES SUKALO, *Examiner.*